United States Patent Office 3,352,690
Patented Nov. 14, 1967

3,352,690
CURING OF VANILLA BEANS
Richard J. Kaul, 4 Burchfield Ave.,
Cranford, N.J. 07016
No Drawing. Filed Apr. 27, 1964, Ser. No. 362,926
8 Claims. (Cl. 99—140)

ABSTRACT OF THE DISCLOSURE

This invention deals with the curing and drying of vanilla beans. The green beans, either whole or cut in a manner so as to not destroy their identity, are subjected in an enclosed space to an atmosphere of high humidity and elevated temperature for a continuous period of time until enzymatic action and associated curing reactions have been substantially completed. Then the beans are dried in a separate step.

The curing may be effected by placing the green beans on trays covered with a water vapor-impermeable covering, such as plastic sheeting.

---

This invention deals with the curing of vanilla beans preparatory for extraction therefrom the vanilla produced during the curing operation. More specifically, it relates to a curing process wherein harvested green or partly-cured vanilla beans are subjected to controlled conditions of temperature and humidity, whereby the drying operation is essentially separated from the curing operation until the manufacture of vanilla is substantially complete, after which the cured beans are dried. Separation of the two processes of curing and drying into two independent steps permits setting the most favorable conditions for each step of the process, thereby obtaining the optimum results.

Vanilla beans, such as the beans from the climbing orchid, *Vanilla fragrans* (Salisb.) Ames, are never allowed to cure on the vines in commercial operations. They are picked green, and then subjected by one of several conventional methods which take many months before the curing is completed. The picked beans do not contain vanilla flavor. This flavoring material is produced in the course of the curing operation. A typical curing operation, as practiced in Mexico, is as follows:

Mexican law prescribes that no picking is to be done before November 15th, but, in practice, this is ignored, and beans are picked as early as the end of September, due to fears of theft. Immature beans give a poorer quality product. Picked green beans are stripped of stems, wrapped up in palm mats in bundles of about 50 lbs., wetted with water, and placed on shelves in a closed room which is heated by a wood fired or oil fired brick tunnel. Here, the beans are kept for about one day at a temperature of 150° F. to 160° F. If the color of the beans is not completely changed to a chocolate brown color, they are put back for a little longer period.

The beans are then put in the sun each day, when there is sun, for about two hours, for 10–15 days. During the remainder of the time, they are put into boxes for "sweating." Since, in the tropics when the beans are grown, there is much rain and frequent period of cloudy weather, it often takes up to two months to get in the above-mentioned number of sunny days. During prolonged intervals of insufficient sun, in order to prevent molding, the beans are taken out of their boxes and spread out on racks indoors.

By January 15th, the first selection is made, and the beans are roughly classified into four grades: ordinary, medium, good, and superior. Generally speaking, the more immature and the smaller, thinner beans go into the lower grades and the large, thick beans go into the higher grades. The beans are given 6–8 more days in the sun, as heretofore described. This takes about one month longer.

By February 15th, the second selection of beans is made according to degree of dryness, and to finalize classification. Beans vary greatly in their rate of drying; the smaller, thinner beans dry more rapidly than the larger, fatter ones. After about one more month, most of which time the beans are kept on the racks, the lowest grade or thinnest beans are considered ready for the last step. By March 15th, they are put into large, unheated boxes for storage, aging, and observation with respect to tendency to mold. Here they are held for about two months.

By May 15th, the beans are tied into approximately one pound bundles, packed into tins, and crated in wood for shipment. During the bundling operation, a final selection for quality is made.

The better grades, i.e., the larger and fatter beans, follow the same procedure described above for the poorest grade, except that the last two steps are spread over a longer time. The best grade is given as much as three months more than the poorest grade. The total time involved in processing the beans, from poorest to best grade, takes six to nine months.

In the Bourbon process, the operation is essentially the same, with the exception that the beans are initially "killed" by plunging them in hot water for one minute, rather than by an oven operation. Then they are cured by heating in the sun, alternating with "sweating" in blankets or in a closed room. In the Guadalupe process, the beans are first "killed" by scratching them with a hack saw blade or other sharp instrument. Access to air is essential for the process.

All of these processes revolve around the curing of the beans, which appears to be initiated by the "killing" of the beans to start the enzymatic action, and subsequently supplying heat to continue this enzymatic action. The supply and maintenance of heat takes various forms, but they all have in common the concommitant drying action which has been found to be detrimental to the curing process, and which limits the degree of completion of the enzymatic and associated reactions involved in the curing process. Curing and drying of the beans in the sun involves variations in temperature due to the thickness of a bean. Tests have shown that there can be a temperature difference as high as 20° F. between a thick and a thin bean, which creates inequalities in curing rate. Furthermore, the thinner beans will dry before the thicker ones, and thus will have a shorter curing time. Therefore, the average quality of the beans is reduced due to these factors.

Processes have been described wherein the beans are chopped, disintegrated and macerated with water or other solvents to produce a cured mass. However, due to the high cost of vanilla beans, considerable adulteration has been practiced in the industry, so that the buyers shy away from products wherein the beans have lost their original identity. Another disadvantage of such processes is that they require expensive equipment such as those made of stainless steel. A still further disadvantage is that the products so produced have a tendency to acquire an undesirable malt or cereal flavor, possibly due to the action of the water.

Another difficulty encountered in the presently-practiced processes, is the development of mold, which affects the marketability of the beans. Since vanilla is produced in hot humid climates, mold is a common occurrence, and if the curing operation takes a long time, there is always the danger of developing molding problems before the beans become cured.

According to the present invention, a rapid curing process is effected first, with the exclusion of drying. Although "killed" beans may be used, one feature of the invention is that "killing" appears to take place simultaneously with the curing operation, and the curing is effected at an unusually accelerated pace, whereby the natural phenolic fungicidal compounds in the beans are rapidly developed and released, so that no problem of molding is encountered. Also, the beans are physically maintained au naturel, so that they do not lose their original identity. This, of course, does not preclude slicing the beans in the manner of French cut string beans, wherein they still retain their essential identity.

In the present invention, the harvested beans are first subjected to an atmosphere of high humidity and elevated temperature for a period of time wherein enzymatic action and associated chemical side reactions are substantially completed toward the formation of vanilla. Thereafter, the beans are subjected to a separate drying step.

During the curing step, the beans are subjected to the action of their own moisture vapor, in the substantial absence of liquid water contacting the body of beans. The curing step may be effected by placing the beans, loosely packed, in bags made of substantially water-vapor-impermeable material, such as plastic sheets of polyethylene, polyvinyl chloride, polystyrene, or the like. In a preferred procedure, the harvested whole beans are subjected to the first step of the process by placing them in shallow foraminous trays, such as woven wire trays, to a depth of one to two inches, and stacking these trays one upon the other. Each stack then is covered with a sheet or jacket of impervious material, such as polyethylene plastic, and the jacketed stacks of trays are placed in an enclosed space which is designed to be maintained at about 95° F. or about 100° F. to about 140° F. or about 150° F. Under these conditions, provision has been made for an adequate air supply. A fan is provided in the room to circulate the air outside of the jacketed stacks and thus provide a uniform temperature throughout the body of the enclosed beans.

Under the aforesaid conditions, the beans presumably are automatically "killed," and the humidity within the jackets immediately rises to about 80% to almost 100%, and enzymatic fermentation begins readily toward the production of vanilla. All of the beans are subjected to uniform conditions of temperature and humidity, and no mold difficulties are encountered.

The aforesaid treatment is continued until the beans are fully cured, the small beans being equally cured with the large, fat beans. This usually takes about one day, for a temperature of about 140° F., to about one week, for a temperature of about 100° F. Samples of beans are taken at intervals and tested to determine their cure. One suitable test involves extracting 13.35 ozs. of the cured beans of 25% maximum moisture content in one gallon of 35% ethyl alcohol. The extract then is separated from the pulp and tests are carried out on samples of the extract for barium number, lead number, resins, vanillin, water soluble ash, water insoluble ash, and alkalinity. Table I gives values for these tests which are satisfactory commercially, for beans from various sources. The actual individual tests, mentioned in the table, are described in "Official Methods of Analysis of the Association of Official Agricultural Chemists," 8th edition (1955).

After the curing has been completed in the foregoing first step, the jackets are removed from the stacks, and the cured beans are now subjected immediately, and without limitations, to the second step wherein they are subjected to drying at lower humidity conditions at ambient or elevated temperature prior to packing. This differentiates strongly from the conventional methods wherein drying must be restricted because of its detrimental effect upon the curing process. The term "green vanilla beans" employed herein will be understood to include partially cured beans.

From the aforesaid, it is apparent that the present invention eliminates a considerable amount of labor, as well as a considerable amount of time. The rate of enzymatic fermentation is accelerated rapidly so that the optimum curing is completed within a very short period. The process eliminates the possibility of developing mold, and gives an equal opportunity for beans of different sizes and maturities to reach the optimum cure. A product is thus produced which has a more uniform and better quality, and there is permitted the application of a rapid drying step prior to shipping.

TABLE I.—F.E.M.A. STANDARD SINGLE STRENGTH EXTRACTS

| | Bourbon Thirds | Mexican Medianas | Mexican Buena Cuts | Bourbon Thirds Splits | Comores | Reunion | Dominican | Guadeloupe | Tahiti Yellow | Average All Types | Max. | Min. |
|---|---|---|---|---|---|---|---|---|---|---|---|---|
| Barium Number | 0.545 | 0.594 | [1] 0.758 | 0.593 | [2] 0.505 | 0.539 | 0.643 | 0.524 | 0.517 | 0.579 | 0.758 | 0.505 |
| Lead Number | 0.884 | 0.934 | [1] 1.080 | 0.940 | 0.844 | [2] 0.823 | 0.991 | 0.869 | 0.870 | 0.915 | 0.050 | 0.823 |
| Lead/Barium Ratio | 1.62 | 1.58 | [2] 1.43 | 1.59 | 1.67 | 1.54 | 1.54 | 1.66 | [1] 1.68 | 1.59 | 1.68 | 1.43 |
| Resins | 0.101 | 0.101 | 0.118 | 0.096 | 0.112 | 0.113 | [1] 0.153 | 0.145 | [2] 0.058 | 0.111 | 0.153 | 0.058 |
| Alcohol, percent | [1] 35.60 | 35.22 | 34.56 | [2] 34.27 | 34.50 | 35.15 | 35.40 | 35.01 | 34.92 | 34.96 | 35.60 | 34.27 |
| Vanillin | 0.280 | 0.245 | 0.146 | 0.290 | 0.247 | 0.306 | [1] 0.366 | 0.336 | 0.186 | 0.267 | 0.366 | 0.146 |
| Total Ash | 0.279 | 0.374 | [1] 0.447 | 0.313 | 0.307 | 0.287 | 0.350 | 0.323 | [2] 0.231 | 0.323 | 0.447 | 0.231 |
| Water Soluble Ash | 0.229 | 0.300 | [1] 0.381 | 0.251 | 0.227 | 0.224 | 0.294 | 0.264 | [2] 0.190 | 0.262 | 0.381 | 0.190 |
| Water Insoluble Ash | 0.052 | [1] 0.079 | 0.067 | 0.062 | 0.075 | 0.063 | 0.065 | 0.059 | [2] 0.040 | 0.062 | 0.079 | 0.040 |
| Alkalinity of W.S. | 2.40 | 3.06 | [1] 3.60 | 2.78 | 2.43 | [2] 2.06 | 3.18 | 2.45 | 2.29 | 2.69 | 3.60 | 2.06 |
| Alkalinity of W.I. | [2] 0.89 | 1.31 | 1.97 | [1] 2.08 | 1.63 | 1.89 | 2.04 | 1.58 | 1.49 | 1.65 | 2.08 | 0.89 |

[1] Equals maximum.  [2] Equals minimum.

I claim:
1. The method of producing cured vanilla beans from green vanilla beans, comprising,
    enclosing the loosely-packed green beans in a space surrounded by a substantially water vapor-impermeable covering,
    subjecting the beans to elevated temperature and an atmosphere of high humidity within said covering for a period of time until enzymatic action and associated curing reactions have been substantially completed,
    removing said covering, and
    thereafter drying the beans in a separate step.

2. The method of producing cured vanilla beans from green vanilla beans, comprising,
    enclosing the loosely-packed green beans in a space surrounded by a substantially water vapor-impermeable sheeting,
    subjecting the beans to a temperature of about 95° F. to about 150° F. and an atmosphere of high humidity within said sheeting for a period of time until enzymatic action and associated curing reactions have been substantially completed,
    removing said sheeting, and
    thereafter drying the beans in a separate step.

3. The method of producing cured vanilla beans from green vanilla beans, comprising,
    placing a layer of green beans in each of a series of foraminous trays,
    stacking said trays vertically on each other,
    covering said stack with a substantially water-vapor impermeable sheet,
    heating said stack to a temperature of about 95° F. to about 150° F. in an atmosphere of high humidity until said beans are cured, removing said sheet, and drying said beans in a separate step.

4. A method of producing cured vanilla beans from green vanilla beans, comprising, placing a layer of green beans in each of a series of foraminous trays, stacking said trays vertically on each other in a manner such as to permit circulation of air around each layer, covering said stack with a substantially water vapor-impermeable sheet, placing said covered stack in a closed space, heating said closed space to a temperature of about 95° F. to about 150° F. in an atmosphere of high humidity until said beans are cured, removing said sheet from said stacks, and drying said beans in a separate step.

5. A method according to claim 4 in which the water vapor-impermeable sheet is a plastic sheet.

6. A method according to claim 4 in which the closed space is provided with means for circulating air therein.

7. The method of producing cured vanilla beans from green vanilla, beans comprising, subjecting the whole green beans in an enclosed space to an atmosphere of high humidity and elevated temperature for a continuous period of time until enzymatic action and associated curing reactions have been substantially completed, and thereafter drying the beans in a separate step.

8. The method of producing cured vanilla beans, according to claim 7, in which the green beans are cut in a manner so as not to destroy their identity.

References Cited

UNITED STATES PATENTS 2,621,127  12/1952  Towt _____ 99—140

A. LOUIS MONACELL, *Primary Examiner.*

H. H. KLARE, *Assistant Examiner.*